No. 877,256. PATENTED JAN. 21, 1908.
R. TEUTSCH.
FLY CATCHER.
APPLICATION FILED DEC. 27, 1906.

UNITED STATES PATENT OFFICE.

RUDOLPH TEUTSCH, OF BERLIN, GERMANY.

FLY-CATCHER.

No. 877,256.　　　Specification of Letters Patent.　　　Patented Jan. 21, 1908.

Application filed December 27, 1906. Serial No. 349,595.

*To all whom it may concern:*

Be it known that I, RUDOLPH TEUTSCH, a subject of the German Emperor, and resident of Berlin, Germany, have invented a certain new and useful Improvement in Fly-Catchers, of which the following is a specification.

This invention relates to a fly-catcher having a band coated with sticky material. The essential feature of the invention is, that at the upper part of a cover for dishes apertures are provided which are covered with the catching strip in such a manner that the flies, attracted by the smell of the comestibles placed on the plates or dishes, are caught on the band.

Figure 1:
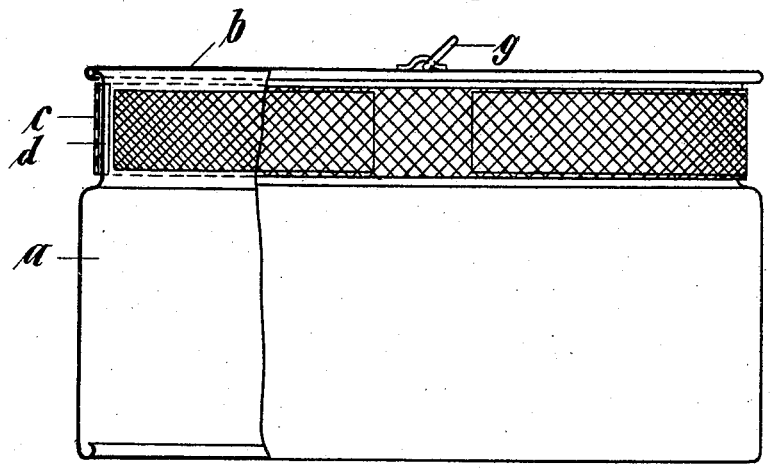
Figure 2:
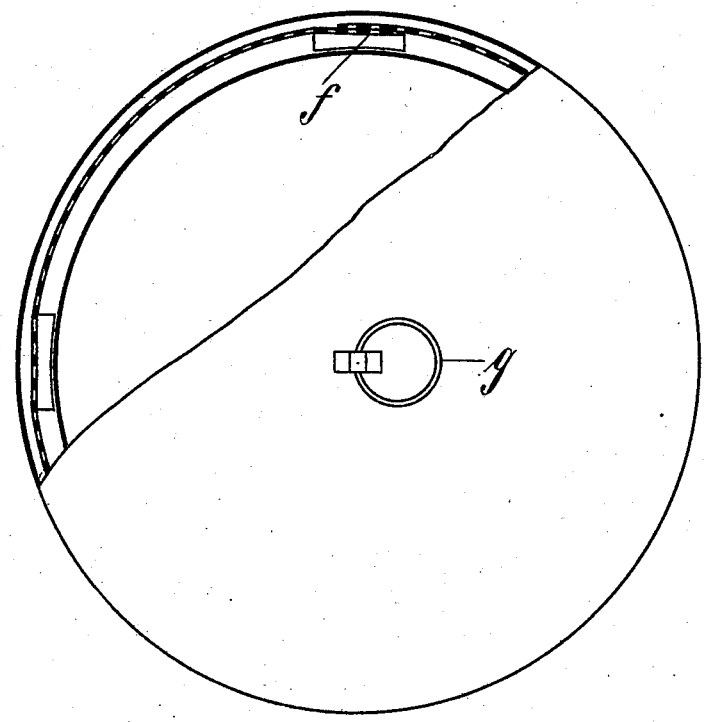

In the accompanying drawings the improved fly-catcher is shown in Figure 1 in a front view, partly in section. Fig. 2 is a ground plan, partly in section.

The cover $a$ made from any suitable material is provided at the upper end, which is of smaller diameter than the lower part, with openings or apertures $d$. The lid $b$ of the cover is fixed or attached to the cover in any suitable manner and provided with a ring, serving as handle. The catching-strip $c$ is made from a strip of thin material coated with glue or any other suitable sticky material adapted to securely catch the flies when, attracted by the smell of the comestibles stored on the plates under the cover, which escapes through the apertures $d$, they sit down on or fly against the strip $c$. The strip $c$ is previously cut to the proper length and placed around the narrow part of the cover, the overlapping ends of the strip being stuck together by the glue.

When the cover is made from glass or from any other hard material the cover is suitably made in one piece with the cover.

What I claim as my invention and desire to secure by Letters Patent is:—

A fly-catcher consisting in combination of a cover for dishes and plates made from suitable material said cover having, an upper narrower part provided with apertures, a catching strip of soft material covered with a coating of adhesive substance adapted to retain the flies placed around the upper narrow part of the cover covering the apertures of the same, substantially as described and shown and for the purpose set forth.

In witness whereof I have hereunto set my hand in presence of two witnesses.

RUDOLPH TEUTSCH.

Witnesses:
　WOLDEMAR HAUPT,
　HENRY HASPER.